(12) United States Patent
Lin

(10) Patent No.: US 9,307,786 B2
(45) Date of Patent: Apr. 12, 2016

(54) AUTOMATIC SPRING-ROLL SHAPING APPARATUS

(71) Applicant: Chao-Hung Lin, New Taipei (TW)

(72) Inventor: Chao-Hung Lin, New Taipei (TW)

(*) Notice: Subject to any disclaimer, the term of this patent is extended or adjusted under 35 U.S.C. 154(b) by 308 days.

(21) Appl. No.: 13/958,036

(22) Filed: Aug. 2, 2013

(65) Prior Publication Data

US 2014/0047984 A1 Feb. 20, 2014

(30) Foreign Application Priority Data

Aug. 20, 2012 (TW) .............................. 101215986 U

(51) Int. Cl.
| | |
|---|---|
| A23P 1/00 | (2006.01) |
| A21C 1/00 | (2006.01) |
| A23P 1/08 | (2006.01) |
| A21C 11/22 | (2006.01) |
| A21C 9/06 | (2006.01) |

(52) U.S. Cl.
CPC ................. *A23P 1/086* (2013.01); *A21C 9/063* (2013.01); *A21C 11/22* (2013.01)

(58) Field of Classification Search
CPC .......... A21C 11/22; A21C 9/063; A23P 1/086
USPC ...................................... 99/353, 450.1, 450.6
See application file for complete search history.

(56) References Cited

U.S. PATENT DOCUMENTS

| | | | |
|---|---|---|---|
| 2,402,874 A * | 6/1946 | Cohen et al. ..................... 425/90 |
| 4,608,919 A * | 9/1986 | Prows et al. ................. 99/450.6 |
| 4,905,583 A * | 3/1990 | Hayashi ........................ 99/450.2 |
| 5,078,585 A * | 1/1992 | Morikawa et al. ............ 425/162 |
| 5,609,094 A * | 3/1997 | Ueno et al. .................... 99/450.2 |
| 2006/0107846 A1* | 5/2006 | Foulon et al. ................ 99/450.1 |

\* cited by examiner

*Primary Examiner* — Reginald L Alexander
(74) *Attorney, Agent, or Firm* — Ostrolenk Faber LLP

(57) ABSTRACT

An automatic spring-roll shaping apparatus converts a spring-roll semiproduct into a spring-roll product, and includes a conveying belt disposed on a machine bed, and a rolling device. The rolling device includes a circular rotating tube rotatable between a shaping position, where the spring-roll semiproduct is rotated in a direction, and a release position, where the spring-roll semiproduct is released from the circular rotating tube so as to be moved by the conveying belt to pass past the circular rotating tube.

8 Claims, 9 Drawing Sheets

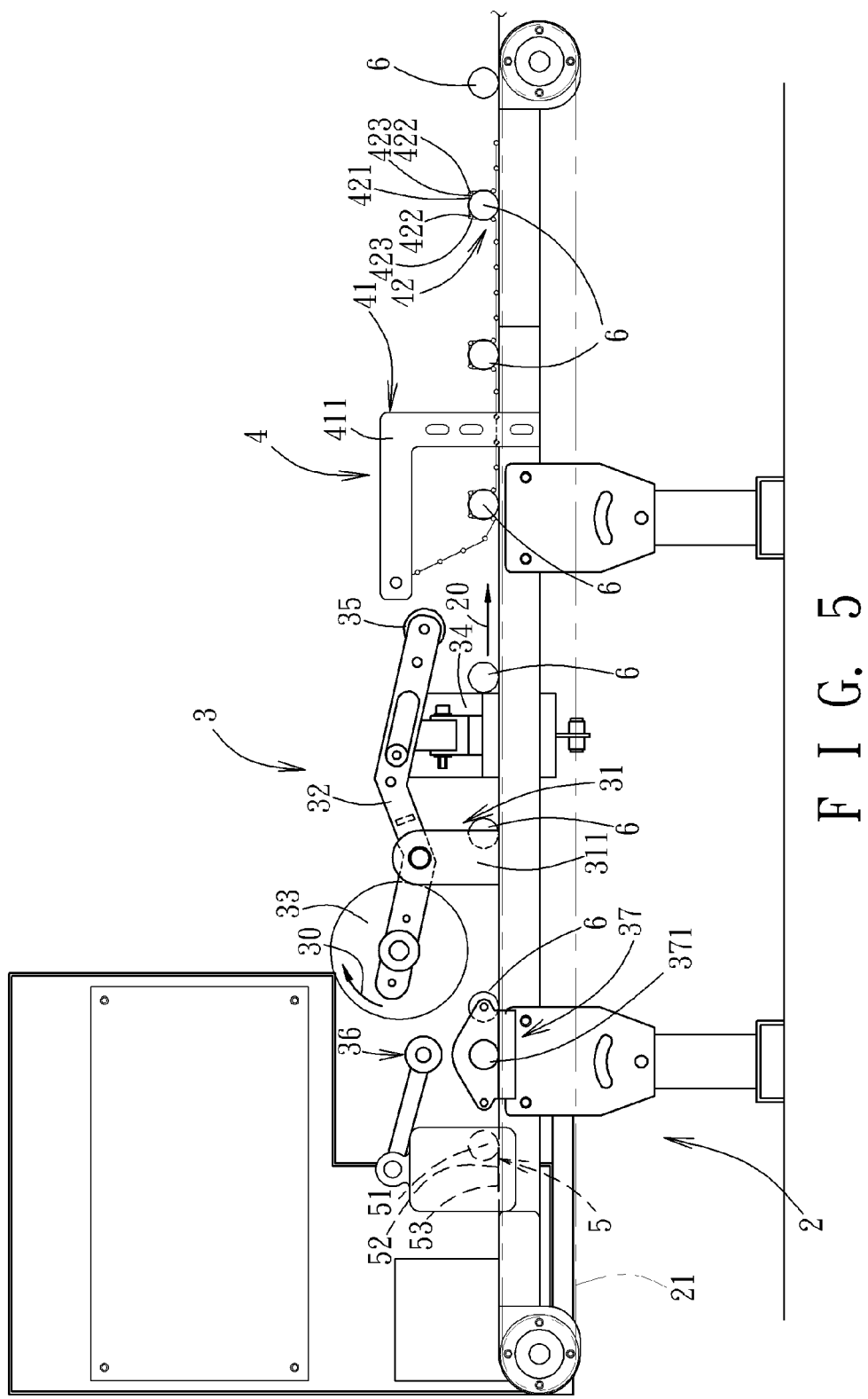
F I G. 5

_(54)_ AUTOMATIC SPRING-ROLL SHAPING APPARATUS

CROSS-REFERENCE TO RELATED APPLICATION

This application claims priority of Taiwanese Application No. 101215986, filed on Aug. 20, 2012.

BACKGROUND OF THE INVENTION

1. Field of the Invention

This invention relates to a shaping apparatus, and more particularly to an automatic spring-roll shaping apparatus for converting a spring-roll semiproduct into a spring-roll product.

2. Description of the Related Art

Referring to FIGS. 1 and 2, a conventional automatic spring-roll shaping apparatus forms a part of an automatic spring-roll shaping machine for converting a spring-roll semiproduct 12 into a spring-roll product 13. The spring-roll semiproduct 12 includes a body 121, a skin extension 122 extending from the body 121, and a batter 123 applied on a trailing end of the skin extension 122. The automatic spring-roll shaping apparatus 11 includes a conveying belt 111 and a stainless steel net 112 disposed above the conveying belt 111. When the spring-roll 12 is moved under the stainless steel net 112, voids formed between the skin and fillings become smaller, and the whole skin extension 122 is eventually attached to the body 121 to form the spring-roll product 13. As such, the trailing end of the skin extension 122 forms easily folds on the body 121. Furthermore, the fillings cannot be received within the skin in a sufficiently close fitting manner, so that, when the spring-roll product is placed into a box, dents are inevitably formed in an outer surface of the spring-roll product due to contact between a hand and the spring-roll product.

SUMMARY OF THE INVENTION

The object of this invention is to provide an automatic spring-roll shaping apparatus for converting a spring-roll semiproduct into a substantially cylindrical spring-roll product, which allows fillings to be received within a skin in a sufficiently close fitting manner.

According to this invention, an automatic spring-roll shaping apparatus converts a spring-roll semiproduct into a spring-roll product, and includes a conveying belt disposed on a machine bed, and a rolling device. The rolling device includes a circular rotating tube rotatable between a shaping position, where the spring-roll semiproduct is rotated in a direction, and a release position, where the spring-roll semiproduct is released from the circular rotating tube so as to be moved by the conveying belt to pass past the circular rotating tube.

Through operation of the rolling device, in the spring-roll product, fillings are received within the skin in a sufficiently close fitting manner to enable the spring-roll product to be substantially cylindrical.

BRIEF DESCRIPTION OF THE DRAWINGS

These and other features and advantages of this invention will become apparent in the following detailed description of the preferred embodiments of this invention, with reference to the accompanying drawings, in which:

FIG. 5 is a view similar to FIG. 3 but illustrating that the circular rotating tube is disposed at a release position;

DETAILED DESCRIPTION OF THE PREFERRED EMBODIMENTS

Figure 1:
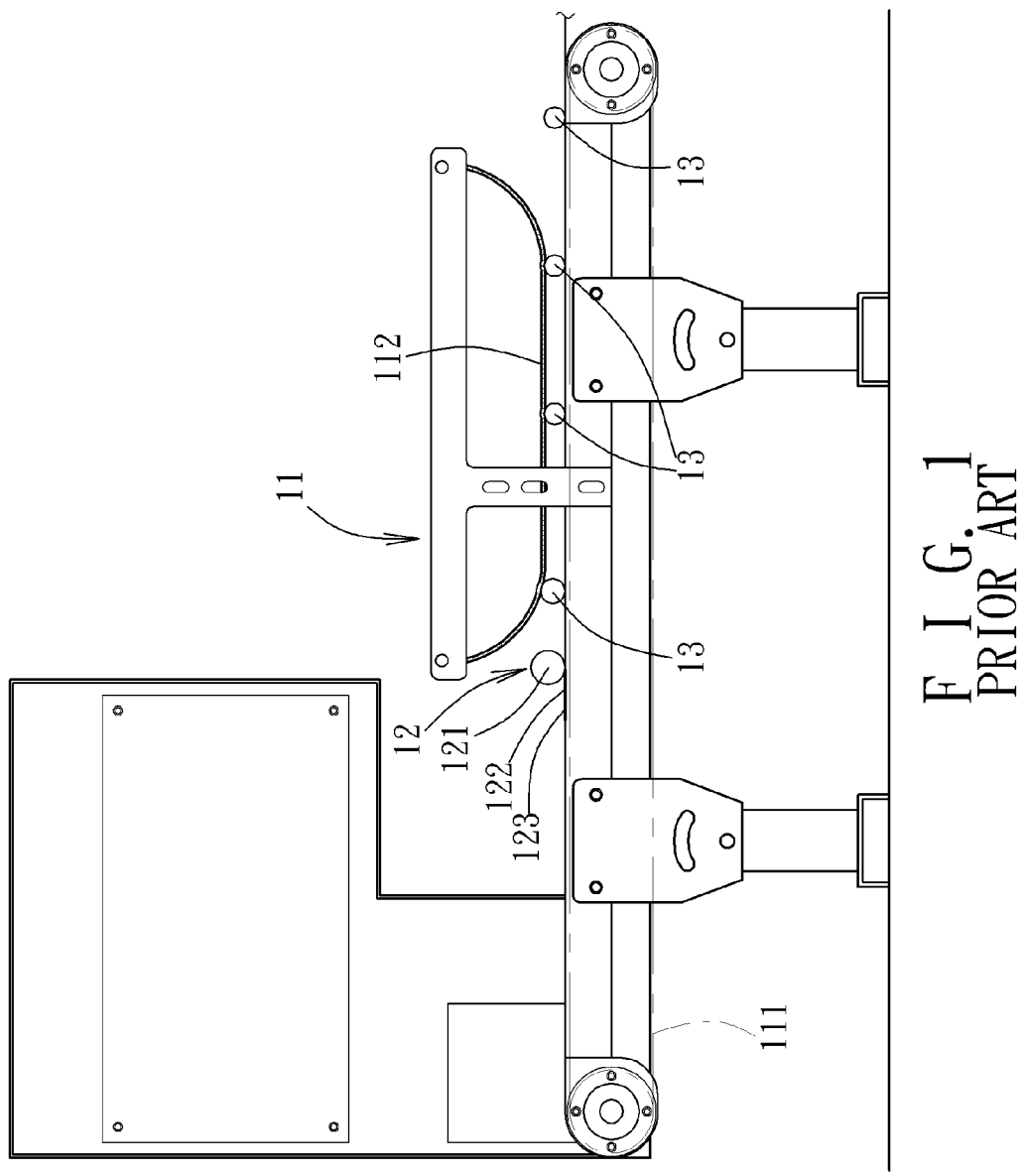
FIG. 1 is a schematic side view of a conventional automatic spring-roll shaping apparatus.
Figure 2:
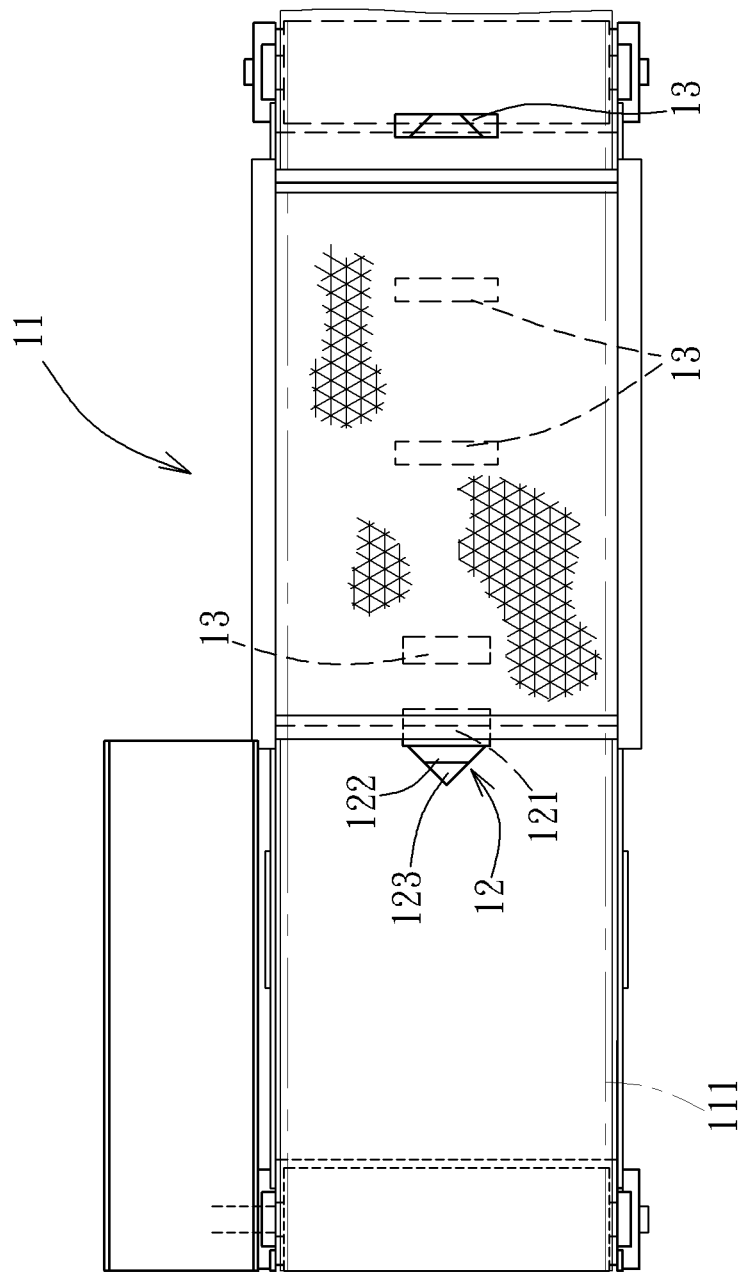
FIG. 2 is a schematic top view of the conventional automatic spring-roll shaping apparatus.

Before the present invention is described in greater detail in connection with the preferred embodiments, it should be noted that similar elements and structures are designated by like reference numerals throughout the entire disclosure.

Figure 3:
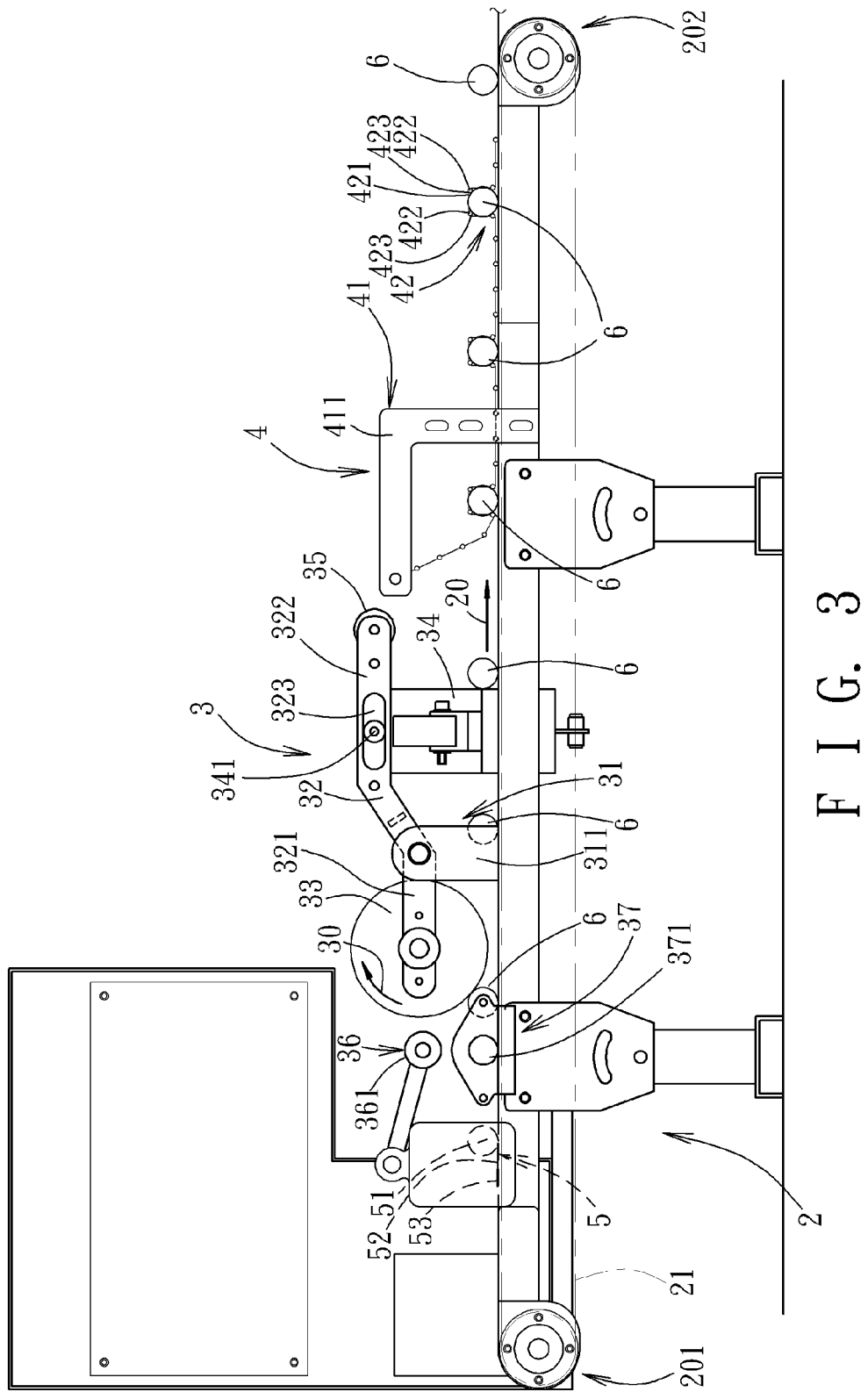
FIG. 3 is a schematic side view of the first preferred embodiment of an automatic spring-roll shaping apparatus according to this invention, illustrating that a circular rotating tube of a rolling device is disposed at a shaping position.
Figure 4:
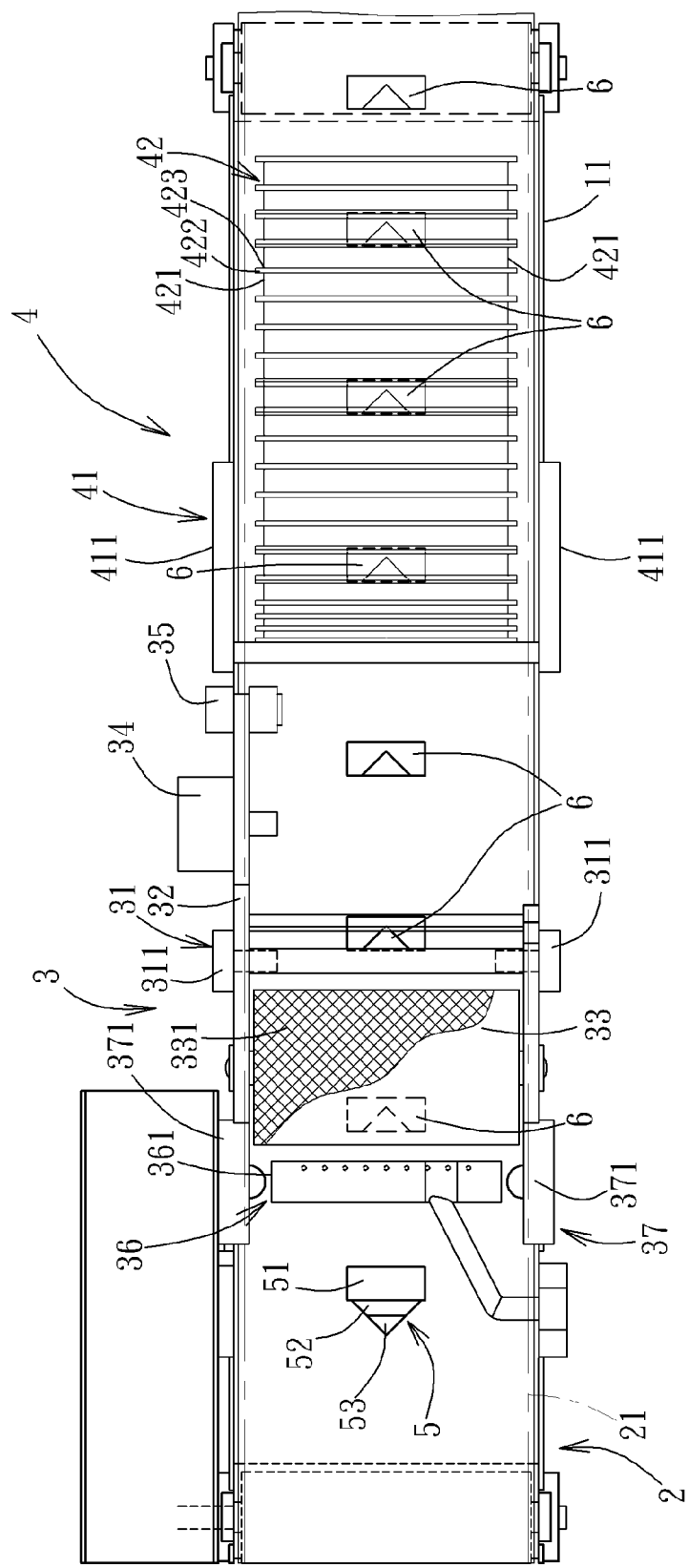
FIG. 4 is a schematic top view of the first preferred embodiment.

Referring to FIGS. 3 and 4, the first preferred embodiment of an automatic spring-roll shaping apparatus according to this invention is adapted to convert a spring-roll semiproduct 5 into a spring-roll product 6. The spring-roll semiproduct 5 includes a body 51 stuffed with fillings, a skin extension 52 extending from the body 51, and a batter 53 applied on a trailing end of the skin extension 52. The automatic spring-roll shaping apparatus includes a machine bed 2, a conveying belt 21, a rolling device 3, and a product output device 4.

The machine bed 2 has an upstream end 201 and a downstream end 202. The conveying belt 21 is mounted to the machine bed 2, and is adapted to move the spring-roll semiproduct 5 on the machine bed 2 from the upstream end 201 to the downstream end 202 in a direction 20. The conveying belt 21 is in frictional contact with the spring-roll semiproduct 5.

The rolling device 3 is disposed on the machine bed 2, and includes a first supporting unit 31, a first crank 32, a circular rotating tube 33, a driving unit 34, a counterweight 35, a pressurization unit 36, and a sensing unit 37.

The first supporting unit 31 includes two crank-supporting members 311 disposed fixedly on the machine bed 2, and located respectively at two opposite sides of the conveying belt 21. The first crank 32 is disposed pivotally on one of the first crank-supporting members 311, and has an upstream crank arm 321 disposed upstream of the first supporting unit 31 and permitting the circular rotating tube 33 to be disposed pivotally thereon, and a downstream crank arm 322 disposed downstream end of the first supporting unit 31. The circular rotating tube 33 is transverse to the conveying belt 21, is thicker than the spring-roll semiproduct 5, and is rotatable in a clockwise direction 30. In this embodiment, an outer peripheral surface of the circular rotating tube 33 is contactable with the spring-roll semiproduct 5, and is knurled to increase friction between the spring-roll semiproduct 5 and the circular rotating tube 33. The downstream crank arm 322 is formed with a slide slot 323 extending along a longitudinal direction thereof. The driving unit 34 may be a motor-driven wheel (not shown), and an eccentric pin 341 disposed on the wheel and received movably within the slide slot 323 in the downstream crank arm 322 of the first crank 32. As such, the first crank 32 is rotated by the driving unit 34 to rotate the circular rotating tube 33 between a shaping position shown in FIG. 3 and a release position shown in FIG. 5. The shaping position is disposed under the release position. As such, the release position is farther away from the conveying belt 21 than the shaping position. In the shaping position, the circular rotating tube 33 cooperates with the conveying belt 21 and the pressurization device 36 to rotate the spring-roll semiproduct 5 in a direction. In the release position, the spring-roll semiproduct 5 is released from the circular rotating tube 33 so as to be driven by the conveying belt 21 to move through a space between the circular rotating tube 33 and the conveying belt 21 to thus pass past the circular rotating tube 33. The counterweight 35 is disposed on the downstream crank arm 322, so that power output of the driving unit 34 can be reduced.

The pressurization unit 36 is disposed immediately upstream of the circular rotating tube 33, and includes a compressed air source 361 for applying compressed air to the spring-roll semiproduct 5 to press the spring-roll semiproduct 5 against the circular rotating tube 33 and the conveying belt 21 to rotate the spring-roll semiproduct 5 in situ when the circular rotating tube 33 is disposed at the shaping position, so as to allow the spring-roll semiproduct 5 to form the spring-roll product 6. In this manner, the skin extension 52 is attached to the body 51 by the batter 53 such that the spring-roll product 6 is cylindrical and is stuffed with the fillings in a comparatively close manner.

The sensing unit 37 is connected to the driving unit 34 and the pressurization unit 36. The sensing unit 37 includes two sensing members 371 disposed on the machine bed 2 and located respectively at two opposite sides of the conveying belt 21. When detecting movement of the spring-roll semiproduct 5 to a position adjacent to the circular rotating tube 33, the sensing unit 37 activates the driving unit 34 to move the circular rotating tube 33 from the release position to the shaping position, and activates the pressurization unit 36 to press the spring-roll semiproduct 5 against the circular rotating tube 33 and the conveying belt 21 for a predetermined time period. Upon ending of the predetermined time period, the driving unit 34 is activated by the sensing unit 37 to drive the circular rotating tube 33 to rotate from the shaping position to the release position so as to allow the spring-roll semiproduct 5 to continue to advance. At the same time, the pressurization device 36 is deactivated by the sensing unit 37.

The product output device 4 is adjacent to the downstream end 202 of the machine bed 2, and is disposed downstream of the rolling device 3. In this embodiment, the product output device 4 includes a second supporting unit 41 disposed on the machine bed 2, and a pressing rod assembly 42.

Figure 6:
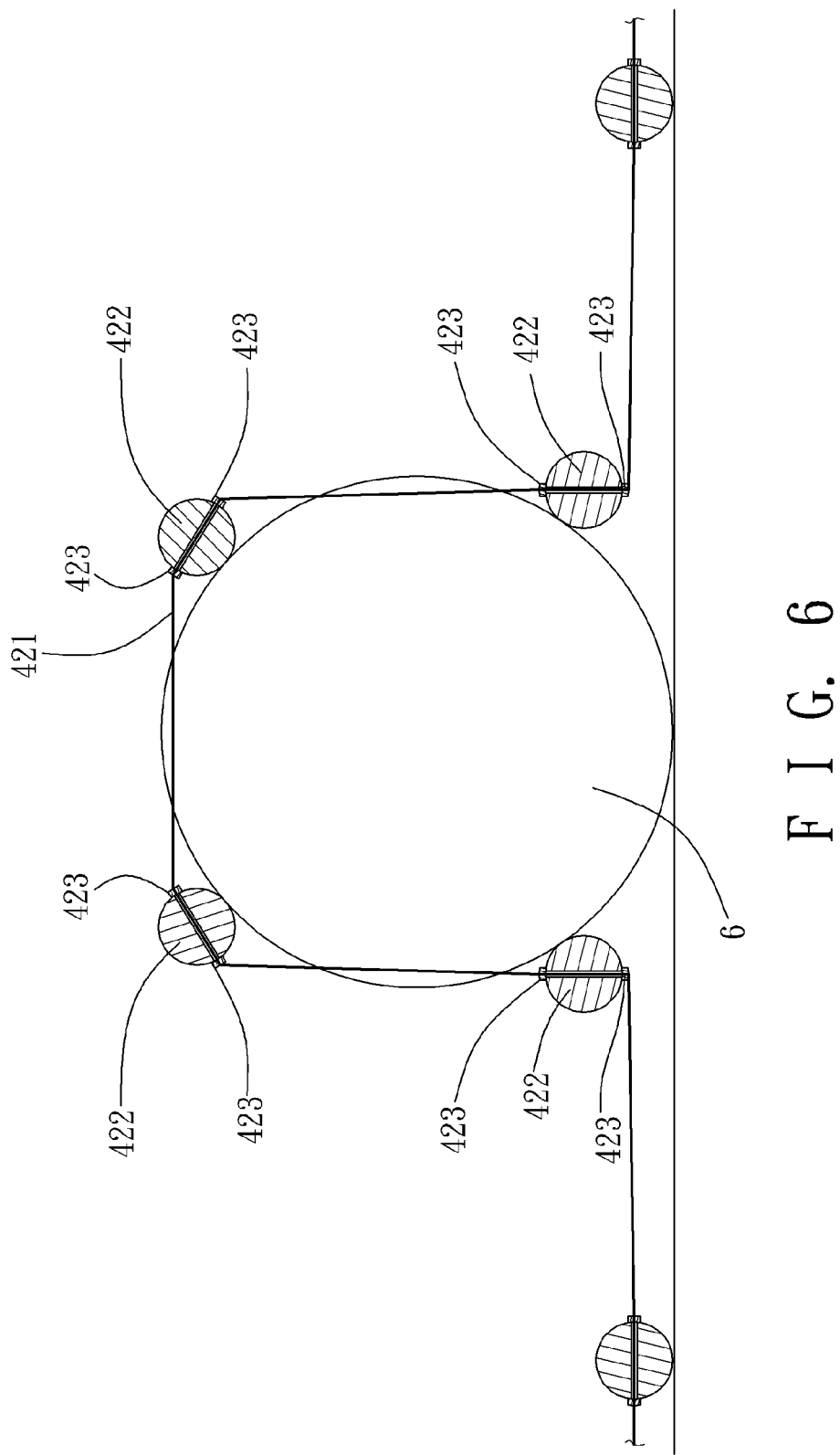
FIG. 6 is a schematic fragmentary side view of the first preferred embodiment, illustrating that a spring-roll product is moved under a product output device.

The second supporting unit 41 includes two L-shaped support frames 411 disposed fixedly on the machine bed 2 and located respectively at two sides of the conveying belt 21. The pressing rod assembly 42 includes two soft belts 421 disposed between two sides of the conveying belt 21, and a plurality of equidistant parallel circular bars 422 made of metal and connected between sand transverse to the soft belts 421. Each of the soft belts 421 has an upstream end fastened to the second supporting unit 41. With particular reference to FIG. 6, in this embodiment, the soft belts 421 are configured as fishing lines. Each of the soft belts 421 extends through a corresponding end of each of the circular bars 422. Each of the circular bars 422 is secured to each of the soft belts 421 by two aluminum tubes 423. During assembly of the circular bars 422 to the soft belts 421, each of the aluminum tubes 423 is sleeved on each of the soft belts 421, and is flattened by pliers (not shown) to prevent removal of the soft belts 421 therefrom. Any two adjacent circular bars 422 are spaced apart from each other by a distance that is about three-fifths of the diameter of the spring-roll semiproduct 5. Each of the circular bars 422 is disposed between and in contact with two aluminum tubes 423, and is sleeved fixedly on the soft belts 421.

As such, as shown in FIGS. 5 and 6, when the spring-roll product 6 is moved under the pressing rod assembly 42, it is in frictional with four of the circular bars 422 in such a manner that two of the four circular bars 422 flank an upper end of the spring-roll product 6, and the remaining two of the four circular bars 422 flank a lower end of the spring-roll product 6. Consequently, when output from the product output unit 4, the spring-roll product 6 is parallel to the circular bars 422, thereby resulting in convenience when moved into a box (not shown).

Figure 7:
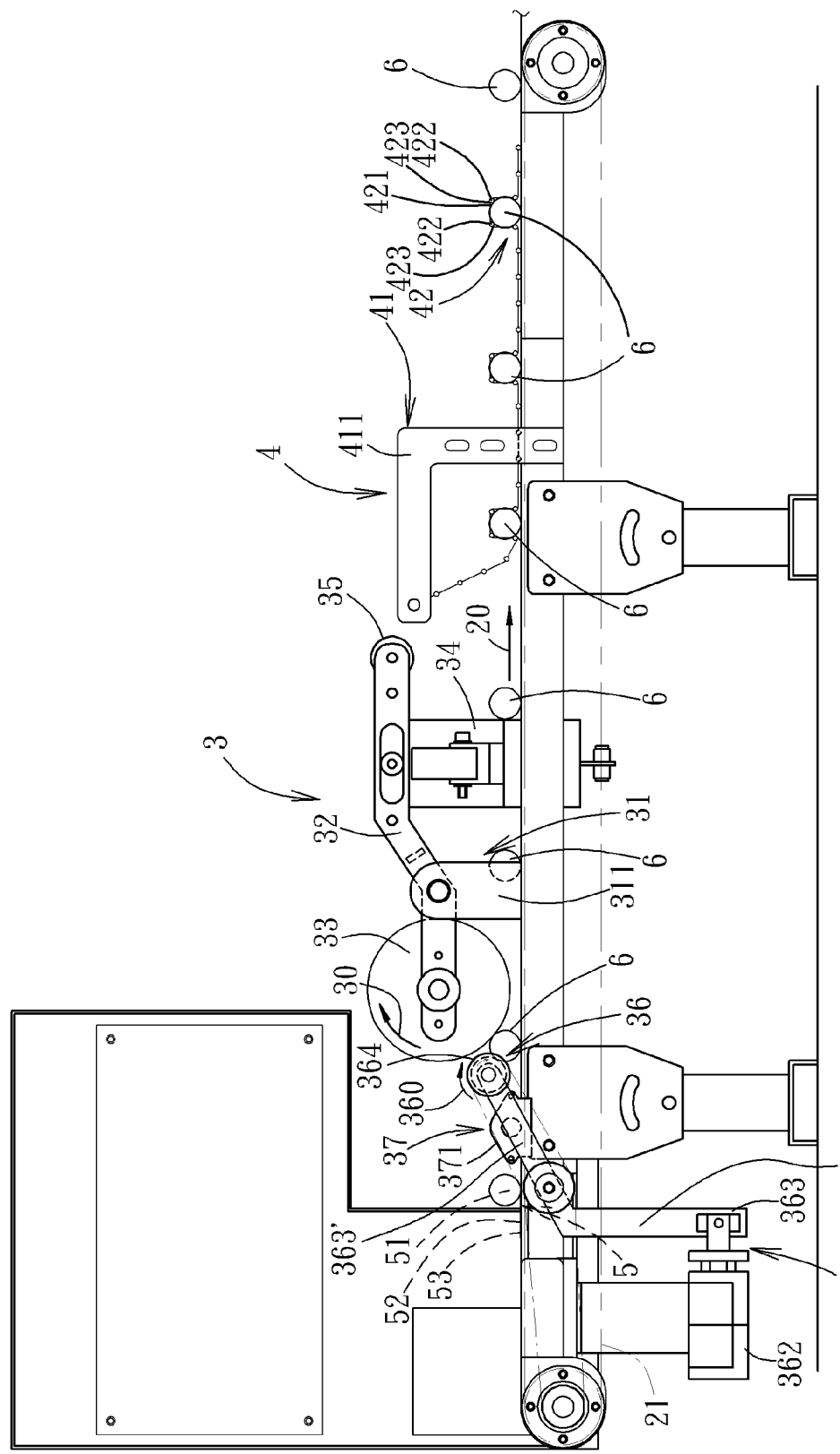
FIG. 7 is a schematic side view of the second preferred embodiment of an automatic spring-roll shaping apparatus according to this invention, illustrating that a circular rotating tube of a rolling device is disposed at a shaping position.
Figure 8:
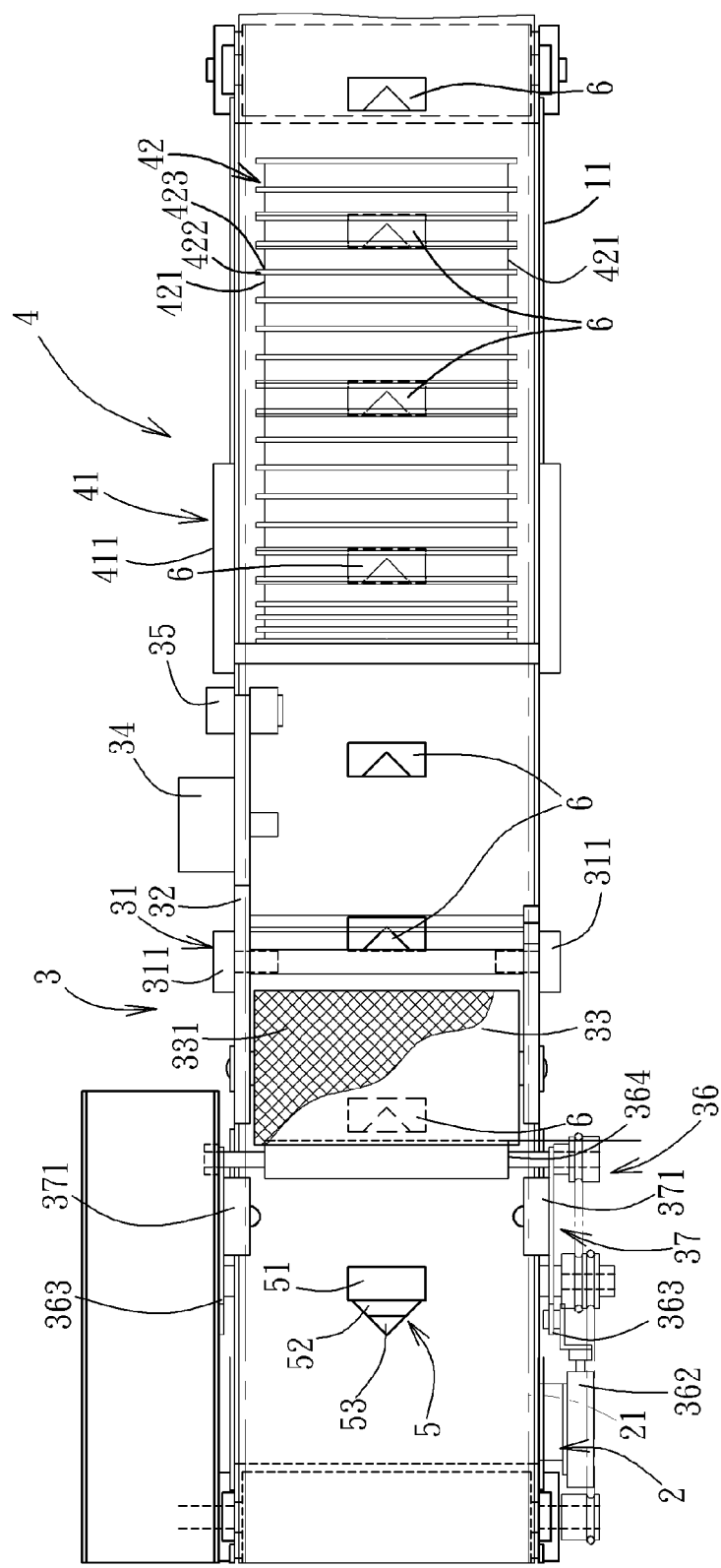
FIG. 8 is a schematic top view of the second preferred embodiment.

FIGS. 7 and 8 show the second preferred embodiment of an automatic spring-roll shaping apparatus according to this invention, which is similar in construction to the first preferred embodiment except for a modified pressurization device 36. The modified pressurization device 36 includes: a second crank 363 disposed pivotally on the machine bed 2 and having an upper crank arm 363' and a lower crank arm 363" disposed below the upper crank arm 363'; an actuator 362 configured as a pressure cylinder and connected to the lower crank arm 363" for rotating the second crank 363; and a rolling cylinder 364 connected pivotally to the upper crank arm 363' and rotatable about a central axis thereof to contact sand press the spring-roll semiproduct 5 against the circular rotating tube 33 and the conveying belt 21 when the circular rotating tube 33 is disposed at the shaping position (see FIG. 7).

Figure 9:
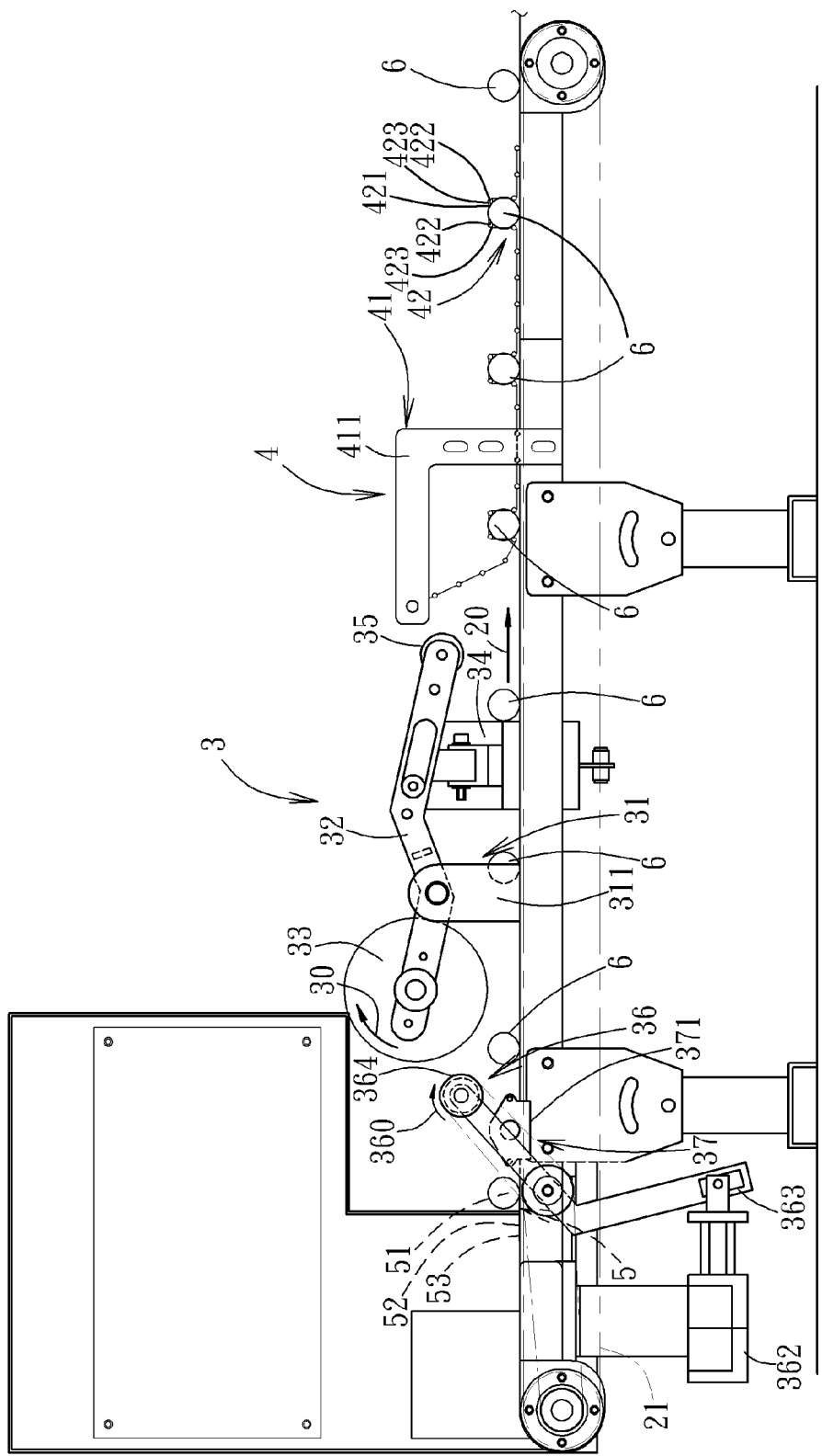
FIG. 9 is a view similar to FIG. 7 but illustrating that the circular rotating tube is disposed at a release position.

With further reference to FIG. 9, upon ending of the predetermined time period, the sensing unit 37 activates the driving unit 34 to move the circular rotating tube 33 from the shaping position to the release position, and activates the actuator 362 to pivot the rolling cylinder 364 upwardly to allow the next spring-roll semiproduct 5 to move through a space between the rolling cylinder 364 and the conveying belt 21.

In view of the above, through operation of the rolling device 3 and the product output device 4, fillings can be received within the skin in a sufficiently close manner to allow the spring-roll product 6 to be substantially cylindrical, such that dents formed in an outer surface of the spring-roll products 6 can be minimized.

With this invention thus explained, it is apparent that numerous modifications and variations can be made without departing from the scope and spirit of this invention. It is therefore intended that this invention be limited only as indicated by the appended claims.

I claim:

1. An automatic spring-roll shaping apparatus adapted to convert a spring-roll semiproduct into a spring-roll product, the spring-roll semiproduct including a body stuffed with fillings, a skin extension extending from the body, and a batter applied on a trailing end of the skin extension, said automatic spring-roll shaping apparatus comprising:

a machine bed having an upstream end and a downstream end;

a conveying belt mounted to said machine bed and adapted to move the spring-roll semiproduct from said upstream end of said machine bed to said downstream end of said machine bed, said conveying belt being adapted to be in frictional contact with the spring-roll semiproduct; and a rolling device including a circular rotating tube that is disposed on and transverse to said conveying belt, that is adapted to be thicker than the spring-roll semiproduct, and that is rotatable between a shaping position, where said circular rotating tube cooperates with said conveying belt to rotate the spring-roll semiproduct in a direction, and a release position, where the spring-roll semiproduct is released from said circular rotating tube so as to be moved by said conveying belt to pass past said circular rotating tube, and a pressurization unit disposed immediately upstream of said circular rotating tube and controllable to press the spring-roll semiproduct against said conveying belt and said circular rotating tube so as to allow the spring-roll semiproduct to rotate in situ when said circular rotating tube is disposed at said shaping position, thereby attaching the skin extension onto the body to form the spring-roll product;

wherein said release position is farther away from said conveying belt than said shaping position so as to allow the spring-roll semiproduct to pass through a space between said circular rotating tube and said conveying belt when said circular rotating tube is disposed at said release position;

wherein said rolling device further includes a first supporting unit disposed fixedly on said machine bed, a first crank disposed pivotally on said first supporting unit and having an upstream crank arm that is disposed upstream of said first supporting unit and that is connected to said circular rotating tube, and a downstream crank arm disposed downstream of said first supporting unit, and a driving unit connected to said downstream crank arm of said first crank for rotating said downstream crank arm relative to said first supporting unit to drive rotation of said circular rotating tube between said shaping position and said released position.

2. The automatic spring-roll shaping apparatus as claimed in claim 1, wherein said circular rotating tube has an outer peripheral surface that is adapted for contact with the spring-roll semiproduct and that is knurled to increase friction between the spring-roll semiproduct and said circular rotating tube.

3. The automatic spring-roll shaping apparatus as claimed in claim 1, wherein said rolling device further includes a counterweight disposed on said downstream crank arm of said first crank, so that power output of said driving unit can be reduced.

4. The automatic spring-roll shaping apparatus as claimed in claim 1, wherein said rolling device further includes a sensing unit connected to said driving unit, said sensing unit activating said driving unit to move said circular rotating tube from said release position to said shaping position when detecting movement of the spring-roll semiproduct to a position adjacent to said circular rotating tube.

5. The automatic spring-roll shaping apparatus as claimed in claim 4, wherein said sensing unit of said rolling device is further connected to said pressurization unit such that, when detecting movement of the spring-roll semiproduct to the position adjacent to said circular rotating tube, said sensing unit activates said pressurization unit to press the spring-roll semiproduct against said circular rotating tube and said conveying belt for a predetermined time period.

6. The automatic spring-roll shaping apparatus as claimed in claim 5, wherein said pressurization unit of said rolling device includes a compressed air source for applying compressed air to the spring-roll semiproduct to press the spring-roll semiproduct against said circular rotating tube and said conveying belt when said circular rotating tube is disposed at said shaping position.

7. The automatic spring-roll shaping apparatus as claimed in claim 5, wherein said pressurization unit of said rolling device includes:

a second crank having an upper crank arm and a lower crank arm disposed below said upper crank arm;

an actuator connected to said lower crank arm and operable for rotating said second crank; and a rolling cylinder connected to said upper crank arm and rotatable about a central axis thereof to contact and press the spring-roll semiproduct against said circular rotating tube and said conveying belt when said circular rotating tube is disposed at said shaping position.

8. An automatic spring-roll shaping apparatus adapted to convert a spring-roll semiproduct into a spring-roll product, the spring-roll semiproduct including a body stuffed with fillings, a skin extension extending from the body, and a batter applied on a trailing end of the skin extension, said automatic spring-roll shaping apparatus comprising:

a machine bed having an upstream end and a downstream end;

a conveying belt mounted to said machine bed and adapted to move the spring-roll semiproduct from said upstream end of said machine bed to said downstream end of said machine bed, said conveying belt being adapted to be in frictional contact with the spring-roll semiproduct; and a rolling device including a circular rotating tube that is disposed on and transverse to said conveying belt, that is adapted to be thicker than the spring-roll semiproduct, and that is rotatable between a shaping position, where said circular rotating tube cooperated with said conveying belt to rotate the spring-roll semiproduct in a direction, and a release position, where the spring-roll semiproduct is released from said circular rotating tube so as to be moved by said conveying belt to pass past said circular rotating tube, and pressurization unit disposed immediately upstream of said circular rotating tube and controllable to press the spring-roll semiproduct against said conveying belt and said circular rotating tube so as to allow the spring-roll semiproduct to rotate in situ when said circular rotating tube is disposed at said shaping position, thereby attaching the skin extension onto the body to form the spring-roll product;

wherein the automatic spring-roll shaping apparatus further comprises a product output device adjacent to said downstream end of said machine bed and disposed downstream end of said rolling device, said product output device including a second supporting unit disposed on said machine bed, and a pressing rod assembly, said pressing rod assembly includes two soft belts disposed between two sides of said conveying belts, and a plurality of equidistant parallel circular bars connected between and transverse to said soft belts, each of said soft belts having an upstream end fastened to said second supporting unit such that, when the spring-roll product output from said rolling device is moved under said pressing rod assembly, said spring-roll product is in frictional contact with four of said circular bars in such a manner that two of said four of said circular bars flank an upper end of the spring-roll product, and the remaining two of said four of said circular bars flank a lower end of the spring-roll product, so that the spring-roll product is parallel to said circular bars when output from said product output unit.

* * * * *